(12) United States Patent
Koederitz

(10) Patent No.: US 9,033,064 B2
(45) Date of Patent: May 19, 2015

(54) METHOD AND SYSTEM FOR MONITORING A WELL FOR UNWANTED FORMATION FLUID INFLUX

(71) Applicant: National Oilwell Varco, L.P., Houston, TX (US)

(72) Inventor: William Leo Koederitz, Cedar Park, TX (US)

(73) Assignee: NATIONAL OILWELL, VARCO, L.P., Houston, TX (US)

( * ) Notice: Subject to any disclaimer, the term of this patent is extended or adjusted under 35 U.S.C. 154(b) by 253 days.

(21) Appl. No.: 13/691,202

(22) Filed: Nov. 30, 2012

(65) Prior Publication Data

US 2013/0146359 A1 Jun. 13, 2013

Related U.S. Application Data

(60) Provisional application No. 61/569,636, filed on Dec. 12, 2011.

(51) Int. Cl.
| | |
|---|---|
| *E21B 44/00* | (2006.01) |
| *E21B 47/00* | (2012.01) |
| *G01V 3/38* | (2006.01) |
| *E21B 21/08* | (2006.01) |

(52) U.S. Cl.
CPC . *G01V 3/38* (2013.01); *E21B 47/00* (2013.01); *E21B 44/00* (2013.01); *E21B 21/08* (2013.01)

(58) Field of Classification Search
USPC .................... 175/25, 26, 38, 48, 50
See application file for complete search history.

(56) References Cited

U.S. PATENT DOCUMENTS

| | | | |
|---|---|---|---|
| 4,754,641 A | 7/1988 | Orban et al. | |
| 4,867,254 A | 9/1989 | Gavignet | |
| 6,755,261 B2 | 6/2004 | Koederitz | |
| 6,820,702 B2 | 11/2004 | Niedermayr et al. | |
| 7,334,651 B2 | 2/2008 | Wu | |
| 8,561,710 B2 * | 10/2013 | Nguyen | 166/387 |
| 2013/0090855 A1 * | 4/2013 | Rasmus et al. | 702/9 |

OTHER PUBLICATIONS

Macondo, "Kick Detection," Chief Counsel's Report. National Commission on the BP Deepwater Horizon Oil Spill and Offshore Drilling, Chapter 4.7, dated Feb. 17, 2011, pp. 165-191 (27 pgs.).

* cited by examiner

*Primary Examiner* — William P Neuder
(74) *Attorney, Agent, or Firm* — Derek V. Forinash; Porter Hedges LLP

(57) ABSTRACT

A method of monitoring a well for unwanted formation fluid influx is disclosed. Measurements of well outflow are acquired during a period in which drilling operations are performed for the well. Occurrences of stagnant flow events during the period are determined. An outflow signature is generated from the well outflow measurements for each stagnant flow event. The outflow signatures are displayed sequentially in time of occurrence. Each outflow signature is analyzed for an anomaly.

19 Claims, 3 Drawing Sheets

METHOD AND SYSTEM FOR MONITORING A WELL FOR UNWANTED FORMATION FLUID INFLUX

CROSS-REFERENCE TO RELATED APPLICATIONS

This application claims priority to U.S. patent application Ser. No. 61/569,636, which was filed Dec. 12, 2011. This priority application is hereby incorporated by reference in its entirety into the present application, to the extent that it is not inconsistent with the present application.

BACKGROUND

The invention relates generally to drilling of wells in subsurface formations. More specifically, the invention relates to monitoring and detecting kicks in a well.

During drilling of a well, drilling fluid (or "drilling mud") is pumped from a mud pit into a drill string that is suspended in the well. The drilling mud flows down the drill string, exiting through a bit at the end of the drill string into the bottom of the well. The drilling mud then returns to the surface, carrying with it formation cuttings made by the bit. At the surface, the drilling mud flows through a mud return line into a mud treatment system, which cleans the drilling mud. The clean drilling mud is returned to the mud pit, from where the drilling mud is again pumped into the drill string. This circulation of the drilling mud continues while the bit is cutting the formation. The drilling mud performs a variety of functions, including carrying formation cuttings to the surface, cooling the bit, and controlling the hydrostatic pressure in the well such that the well does not take a kick. A well is said to take a kick whenever there is unwanted influx of formation fluids into the well.

The hydrostatic pressure in the well is controlled through the weight of the drilling mud. In spite of careful control of drilling mud weight, a well may take a kick unexpectedly. Thus the normal practice is to monitor the well for kicks so that as soon as a kick is detected measures can be put into place to circulate the kick out of the well and stabilize the well. If a kick is not detected early enough and controlled, it may result in blowout of the well. Strategies for detecting kicks generally include (i) monitoring increases in the difference between the volume of fluid pumped into the well and the volume of fluid returning from the well, (ii) monitoring increases in the difference between the rate at which fluid is pumped out of the well and the rate at which fluid is pumped into the well, (iii) monitoring fluctuations in drill pipe pressure, and (iv) monitoring increases in gas content of fluid returns from the well. It is common to use a combination of these strategies to effectively detect kicks during drilling operations.

The flow rate monitoring strategy is often used when drilling mud is not being pumped into the drill string, such as when making connections between drill pipes. The principle here is that if the well inflow is zero and the well is stable, the well outflow should also be zero. The current practice when using this strategy is to physically inspect the mud return line to confirm that flow stopped when the mud pump(s) stopped pumping drilling mud into the drill string. Rig personnel can look inside the bell nipple, which is a large diameter pipe at the top of the well to which the mud return line is attached, or further down the mud return line, such as at the shale shakers, to visually observe any signs of flow. However, when the rig crew first shuts the mud pump down, it generally takes some period of time for well outflow to drop to zero. To detect a kick early, the rig personnel inspecting the mud return line with the naked eye would need to be able to quickly distinguish between residual flow and anomalous flow that may be indicative of a kick.

SUMMARY

In one aspect, a method of monitoring a well for unwanted formation fluid influx includes acquiring measurements of well outflow during a period in which drilling operations are performed for the well. The method includes determining occurrences of stagnant flow events during the period and generating an outflow signature from the well outflow measurements for each stagnant flow event. The method includes displaying at least a portion of the outflow signatures sequentially in time of occurrence. The method includes analyzing each outflow signature for an anomaly.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1:
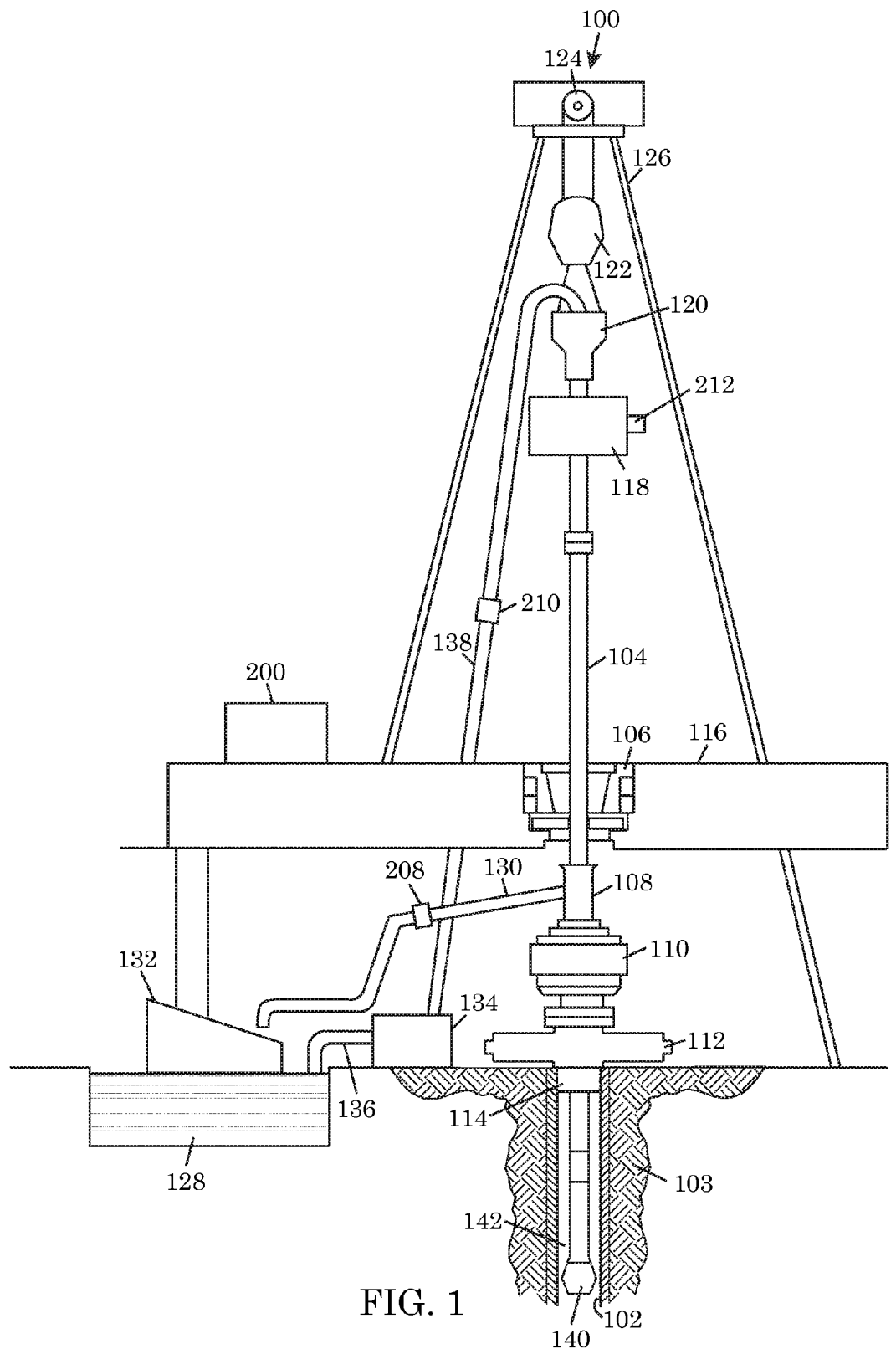
FIG. 1 shows a system for drilling a well.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein. For the purposes of this application, the term "real-time" means without significant delay.

FIG. 1 shows an example of a system 100 for drilling a well 102 in subsurface formation 103. A drill string 104 extends through a rotary table 106, a bell nipple 108, blowout preventers 110, 112, and a wellhead 114 into the well 102. The rotary table 106 is mounted in a drill floor 116, and the bell nipple 108, blowout preventers 110, 112, and wellhead 114 are below the rotary table 106. (In marine drilling, the blowout preventers and wellhead would be located at or near the seafloor and a marine riser may extend between the seafloor and the drill floor.) The drill string 104 is coupled at the top to a top drive 118, which is coupled to a swivel 120. A traveling block 122 coupled to the swivel 120 hangs down from a crown block 124 at the top of a derrick 126. The traveling block 122 travels up and down the derrick 126 via a pulley system. The bell nipple 108 is in hydraulic communication with a mud pit 128 via a return flow line 130. A shale shaker 132 filters debris out of the drilling mud flowing into the mud pit 128. A mud pump 134 is in hydraulic communication with the mud pit 128 via a suction flow line 136. The mud pump 134 is also in hydraulic communication with the swivel 120 via a discharge flow line 138. The swivel 120 is in hydraulic communication with the top drive 118, which is in hydraulic communication with the drill string 104.

The mud circulation system starts at the mud pit 128 containing the drilling mud. The mud pump 134 pumps drilling mud from the mud pit 128 into the swivel 120. From the swivel 120, the drilling mud flows into the top drive 118 and then into the drill string 104. The drilling mud flows down the drill string 104 and exits into the bottom of the well 102 through a bit 140. At the bottom of the well 102, the drilling mud commingles with formation cuttings made by the bit 140. The drilling mud with the formation cuttings is then forced up a return annulus 142 defined between the well 102 and the drill string 104 into the bell nipple 108. From the bell nipple 108, the drilling mud flows through the shale shaker 132 into the mud pit 128. The shale shaker 132 removes debris from the drilling mud. Additional conditioning of the drilling mud may occur inside the mud pit 128 before the drilling mud is again circulated through the system. (For a dual-bore drill string, the return annulus would be defined inside the drill string. Also, a device other than a bell nipple may be used to divert the drilling mud from the return annulus to the mud pit.)

Figure 2:
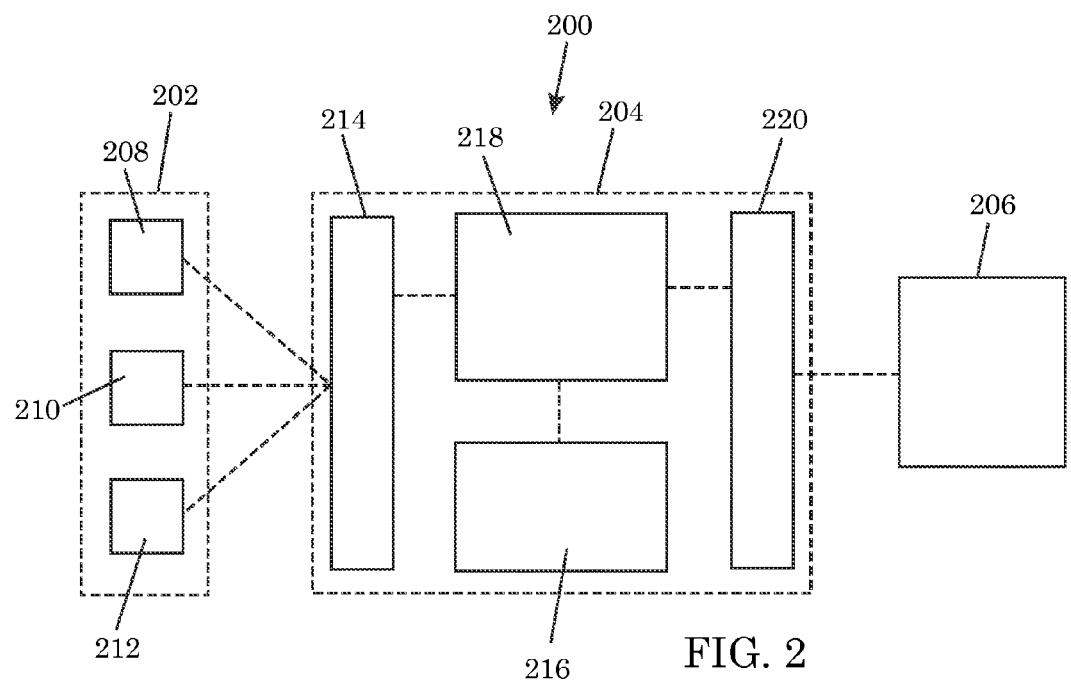
FIG. 2 shows a block diagram of a system for monitoring a well.

FIG. 2 shows a system 200 for monitoring the well 102 (in FIG. 1). The system 200 has a measurement module 202, a processing module 204, and a display device 206. The measurement module 202 includes one or more sensors, such as sensors 208, 210, and 212, for measuring one or more parameters related to well monitoring. In one embodiment, the sensor 208 measures well outflow, which is the rate at which drilling mud flows out of a well. In one embodiment, the sensor 210 measures well inflow, which is the rate at which drilling mud is pumped into a drill string in a well. In one embodiment, the sensor 212 measures movement, such as axial movement or rotation, of a drill string performing operations in a well. In FIG. 1, the sensor 208 is arranged in the return flow line 130 to measure well outflow. The sensor 208 may be any flowmeter that can work with particulate fluid. The flowmeter may make relative or absolute measurements. In one embodiment, the sensor 208 is a paddle-type flowmeter. The sensor 210 is arranged in the discharge flow line 138 to measure well inflow. The sensor 212 is arranged on the top drive 118 to measure movement of the drill string 104. It is possible to arrange the sensors 208, 210, 212 at locations other than indicated in FIG. 1 as long as the desired parameters can be measured at the other locations.

In FIG. 2, the processing module 204 receives the measurements made by the sensors 208, 210, 212 via an input interface 214. Transmission of measurements from the sensors 208, 210, 212 to the processing module 204 may be direct or indirect. In the latter case, for example, measurement signals from the sensors 208, 210, 212 may be preprocessed or stored elsewhere before being transmitted to the processing module 204. The processing module 204 includes a memory or storage device 216 for holding the measurements as well as other data and programs, such as a well monitoring program. The memory or storage device 216 may take the form of one or more floppy disks, a CD-ROM or other optical disk, a magnetic tape, a read-only memory chip (ROM), and other forms of memory or storage device well known in the art or subsequently developed. The processing module 204 has a processor device 218, which can read programs and data on the memory or storage device 216. The processing module 208 executes programs and controls operations of the processing module 204. The programs executed by the processor device 218 may be in binary form or object code, in source code, or in some intermediate form such as partially complied code. The processing module 204 communicates with the display device 206 via an output interface 220. The communication interfaces 214, 216 of the processing module 204 may include wired or wireless links that allow the system to operate in a substantially real-time manner.

The processing module 204 generates outflow signatures for stagnant flow events. A stagnant flow event occurs when drilling mud is not being pumped into the drill string 104 (in FIG. 1) and when the drill string 104 is not moving. Typically, stagnant flow events occur when making up or breaking out pipe connections. The outflow signatures are generated from the well outflow measurements. However, to generate the outflow signatures for the stagnant flow events, knowledge of the starting time and ending time of each stagnant flow event is needed. In one embodiment, this knowledge may be gleaned from the well inflow measurements made by the sensor 210 and from the drill string movement measurements made by the sensor 212. It should be noted that other records besides well inflow measurements and drill string movement measurements may be used to determine the starting times and ending times of stagnant flow events. For example, the controller of the mud pump 134 (in FIG. 1) may send messages to the processing module 204 whenever there is a switch in the state of the mud pump 134, and the controller of the top drive 118 (in FIG. 1) may send messages to the processing module 204 whenever there is a switch in the state of the top drive 118. The processing module 204 can make note of the time of the messages and use it to determine the starting and ending times of stagnant flow events.

The processing device 214 executes the well monitoring program while drilling operations are being carried out on the well 102 (in FIG. 1). Drilling operations encompass all operations related to drilling of the well 102. The well monitoring program, when executed, causes the processing module 204 to listen for stagnant flow events. Listening may involve requesting for and receiving data that would indicate whether drilling fluid is being pumped into the drill string 104 or not and whether the drill string 104 is moving or not. When the well monitoring program detects a stagnant flow event, the well monitoring program causes the processing device 218 to generate an outflow signature for the stagnant flow event and causes the display device 206 to render the outflow signature as the stagnant flow event is unfolding. The well monitoring program causes the processing device 218 to analyze the outflow signature to determine whether the outflow signature includes an anomaly that may indicate a kick or other well control event. The well monitoring program may cause the processing device 218 to generate an alarm if it is determined that the outflow signature includes an anomaly or otherwise indicates a potential kick or well control event. How the well monitoring program works will be further explained by way of an example.

Figure 3A:
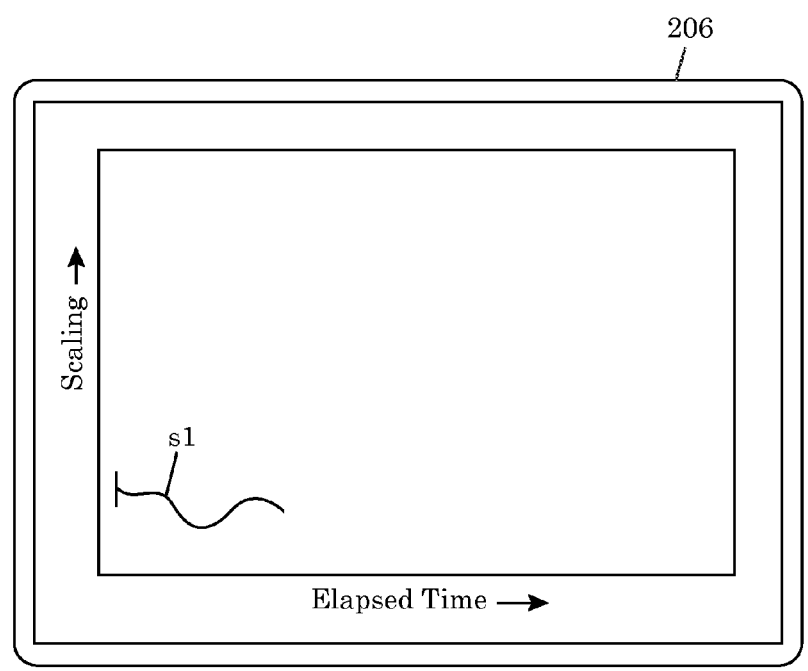
FIG. 3A shows a partial outflow signature on a display device.
Figure 3B:
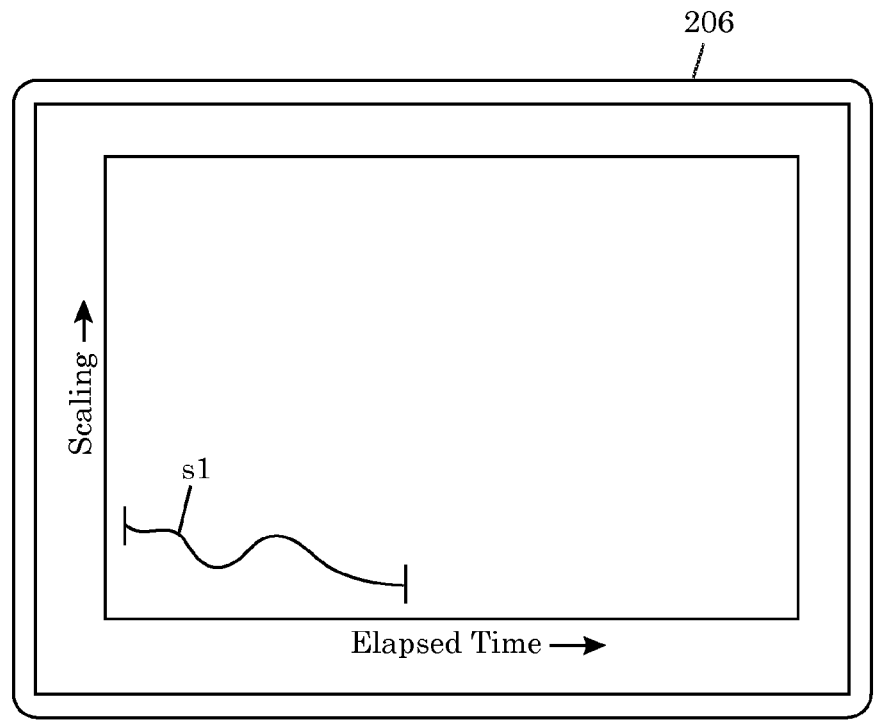
FIG. 3B shows a complete outflow signature on a display device.

For illustration purposes, at some $t_{1\_start}$, a stagnant flow event $S_1$ starts. The processing module 204 detects that the stagnant flow event $S_1$ has started and sends a signal to the display device 206 to display a start marker corresponding to $t_{1\_start}$. Then, the processing module 204 starts processing the well outflow measurements made from time $t_{1\_start}$ to generate an outflow signature that is representative of the well outflow from time $t_{1\_start}$. The processing module 204 sends signals to the display device 206 as the outflow signature is generated, and the display device 206 renders the outflow signature relative to the start marker. FIG. 3A shows outflow signature s1 on display device 206 as the outflow signature is being generated. An outflow signature is an impression of a well outflow and shows simply how the well outflow is trending with time, i.e., whether the well outflow is increasing or decreasing or not changing and whether any increase or decrease in well outflow is fast or slow or small or large. The processing module 204 continues processing the well outflow measurements and updating the outflow signature until the time $t_{1\_end}$ when the stagnant flow event S1 ends. The processing module 204 sends a signal to the display device 206 to display an end marker corresponding to time $t_{1\_end}$. FIG. 3B shows the complete outflow signature s1 on the display device 206.

Figure 4:
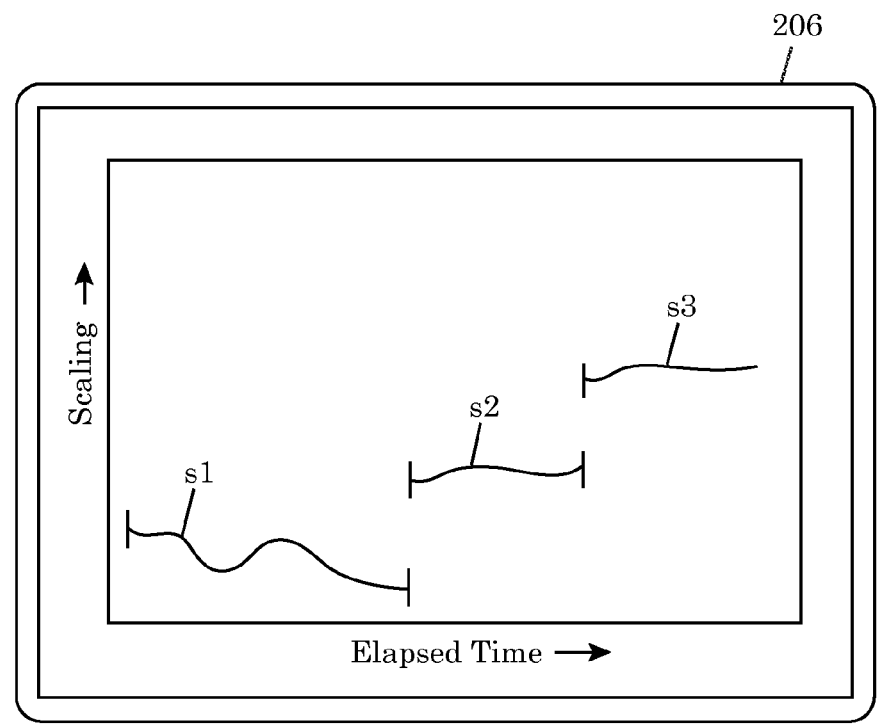
FIG. 4 shows a sequence of outflow signatures on a display device.

After the stagnant flow event $S_1$ has ended, the processing module 204 goes back to listening for the next stagnant flow event. For each new stagnant flow event detected, the processing module 204 will generate a new outflow signature and send signals to the display device 206 to render the new outflow signature along with a few or all of the previous outflow signatures. On the display device 206, the outflow signatures are displayed sequentially in time of occurrence. Also, the outflow signatures are separated spatially so that one outflow signature can be told apart from another outflow signature visually. FIG. 4 shows an example of a sequence of outflow signatures on the display device 206. The sequence includes completed outflow signatures s1, s2 and outflow signature s3 that is being generated. Drilling personnel can visually observe the outflow signatures on the display device 206 as they are being generated by the processing device 218 (in FIG. 2). If rig personnel see an outflow signature that is anomalous, the rig personnel may assume that the well has taken a kick and raise an alarm. Alternatively, the processing module 204 can analyze the outflow signatures and trigger an alarm if an anomalous outflow signature is detected. The alarm may be acoustic or visual. In the latter case, the alarm may graphical or textual. The alarm could be sent to a control room to enable the rig crew to take appropriate actions.

During a stagnant flow event, the well inflow will be zero. If the well has not taken a kick, the well outflow should also be zero during a stagnant flow event. Initially, the well outflow will not be zero due to residual flow. However, the well outflow should drop to zero and stay at zero if the well is stable. Therefore, an outflow signature may be considered anomalous if the outflow signature does not show a generally decreasing flow. In other words, an outflow signature is anomalous if it indicates non-residual well outflow. In such a case, the processing module 204 of FIG. 2 may trigger an alarm. Another way that the processing module 204 may determine when an outflow signature is anomalous is by pattern recognition. For example, the processing module 204 may compare each outflow signature to a set of test outflow patterns known to be indicative of a kick in a well, i.e., a set of anomalous flow patterns. If the pattern of the outflow signature matches any of the test outflow patterns, the processing module 204 may raise an alarm. In certain embodiments, the processing module 204 may compare an outflow signature to a previously generated outflow signature to determine whether the outflow signature includes an anomaly that may indicate a kick or other well control event.

In addition to monitoring well outflow during stagnant flow events, other kick indicators may be monitored. For example, the volume of the mud pit 128 (in FIG. 1) may be monitored during tripping events. Abnormal gains in the volume of the mud pit 128 may indicate that a kick is underway in the well 102 (in FIG. 1). A suitable sensor, such as an infrared camera, may be used to monitor the fluid level in the mud pit 128, which can be translated to the volume of fluid in the mud pit 128. The measurements may be transmitted to the processing module 204, which can process the measurements and cause the display 206 to render a volume history of the mud pit. The volume history can be in the form of volume signatures, where each volume signature would correspond to a tripping event. The volume signature would simply show how the volume of the mud pit is trending. The volume history will typically be shown separately from the outflow signatures. However, the time frame of the volume history displayed may correspond to that of the outflow signatures displayed. This would allow both the volume history and outflow signature to be used to detect a kick in the well. If the processing module 204 finds an anomalous outflow signature during analysis of outflow signatures, as described above, the processing module 204 can check the volume history to see if there has been an abnormal gain in the volume of the mud pit 128 before triggering an alarm that the well may have taken a kick.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of monitoring a well for unwanted formation fluid influx, comprising:
    acquiring well outflow measurements during a period in which drilling operations are performed for the well;
    determining occurrences of stagnant flow events during the period by analyzing the well outflow measurements;
    generating an outflow signature from the well outflow measurements for each stagnant flow event;
    displaying each outflow signature sequentially in time of occurrence; and
    analyzing each outflow signature for an anomaly.

2. The method of claim 1, further comprising triggering an alarm if an anomaly is found while analyzing each outflow signature.

3. The method of claim 1, wherein the acquiring, determining, generating, displaying, and analyzing steps operate in a substantially real-time manner.

4. The method of claim 1, wherein each outflow signature is displayed and analyzed in a substantially real-time manner.

5. The method of claim 1, wherein the determining step includes acquiring measurements of well inflow during the period.

6. The method of claim 1, where in the determining step includes acquiring measurements of movement of a drill string performing drilling operations.

7. The method of claim 1, wherein the generating step includes selecting portions of the well outflow measurements corresponding to the stagnant flow events and generating the outflow signatures from the selected portions.

8. The method of claim 1, wherein the analyzing step includes comparing the outflow signature to a previously determined outflow signature.

9. The method of claim 1, wherein the analyzing step includes comparing each outflow signature to known anomalous flow patterns.

10. The method of claim 1, further comprising monitoring changes in a volume of drilling mud in a drilling mud pit and triggering an alarm if an anomaly is found during the analyzing step and the anomaly is accompanied by an abnormal gain in the volume of drilling mud in the drilling mud pit.

11. A method of detecting a well influx, comprising:
    monitoring well inflow and movement of a drill string to identify a stagnant flow event;
    measuring well outflow during a stagnant flow event;
    determining a well outflow signature from the well outflow measurements; and
    analyzing the well outflow signature to determine if the outflow signature is anomalous.

12. The method of claim 11, further comprising triggering an alarm if the outflow signature is anomalous.

13. The method of claim 11, wherein each outflow signature is displayed on a display device.

14. The method of claim 11, wherein the analyzing step includes comparing the outflow signature to a previously determined outflow signature.

15. The method of claim 11, wherein the analyzing step includes comparing each outflow signature to known anomalous flow patterns.

16. A system for detecting a well influx comprising:
    a processing module;
    a well outflow sensor coupled to the processing module and operable to measure the flow of fluids out of a well;
    a well inflow sensor coupled to the processing module and operable to measure the flow of fluids into a well;
    a display device coupled to the processing module and operable to display a well outflow signature that is generated by the processing module using the measured flow of fluids out of the well as provided by the well outflow sensor, wherein the processing module generates a well outflow signature in response to the detection of a stagnant flow event as indicated by the measured flow of fluids into the well as provided by the well inflow sensor; and
    a drill string sensor that is coupled to the processing module and is operable to measure the movement of a drill string, wherein the measured movement of the drill string is utilized by the processing module to detect a stagnant flow event.

17. The system of claim 16, further comprising an alarm that is coupled to the processing module, wherein the alarm is triggered if an anomalous well outflow signature is detected.

18. The system of claim 16, further comprising a memory device that is coupled to the processing module and is operable to store a plurality of well outflow signatures.

19. The system of claim 16, wherein the display device is operable to display a plurality of well outflow signatures.

* * * * *